Feb. 16, 1960  B. M. GORDON  2,925,555
FREQUENCY METER DEVICE
Filed Nov. 2, 1956
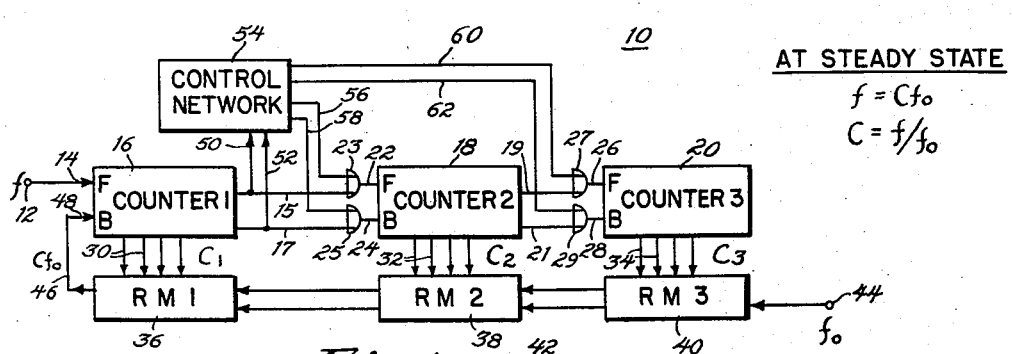
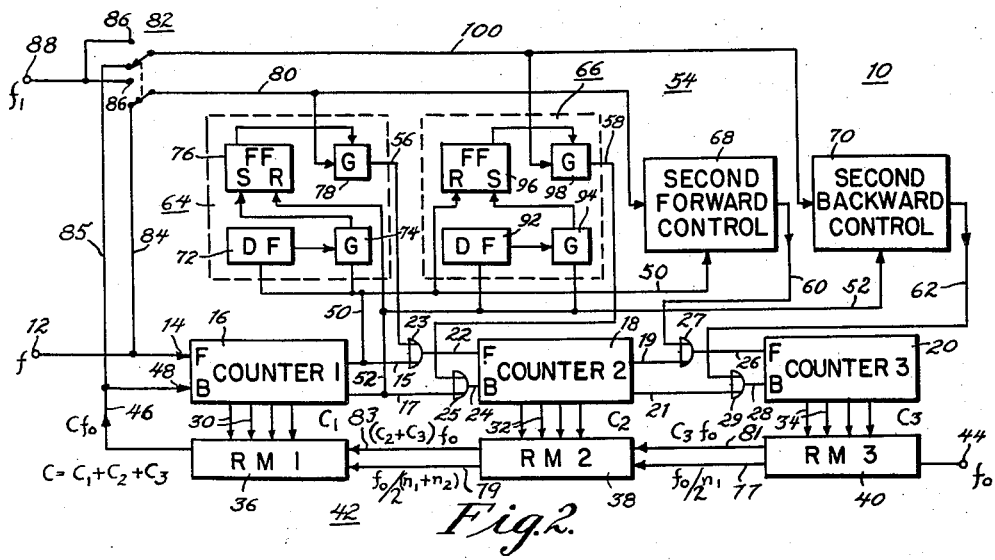
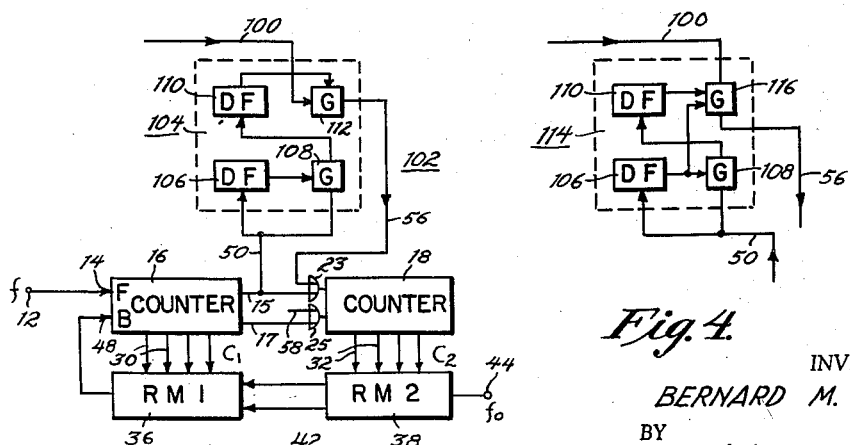
INVENTOR.
BERNARD M. GORDON
BY
Trachtman & Zoda
ATTORNEYS.

United States Patent Office 2,925,555
Patented Feb. 16, 1960

2,925,555

FREQUENCY METER DEVICE

Bernard M. Gordon, Newton, Mass., assignor to Epsco, Incorporated, Boston, Mass., a corporation of Massachusetts Application November 2, 1956, Serial No. 620,089

20 Claims. (Cl. 324—78)

The invention relates to a counting device and more particularly to a frequency meter device of the closed loop servo-type provided with means for accelerating its operation.

This is a continuation in part of application for U.S. Letters Patent, application Serial No. 542,875, filed by me on October 26, 1955, and entitled "Frequency Meter."

The invention provides a counting apparatus and frequency meter of the servo-type delivering an output signal in binary form proportioned to the rate of sequentially received signals delivered to the apparatus and embodying means for accelerating its operation.

Heretofore, signal responsive counting and frequency measuring devices of the servo-type have been provided which have responded exponentially to changes in the frequency being measured. The normal exponential response of such devices to changes of frequency have limited their frequency response and accuracy with which changes in frequency can be followed.

It is therefore a primary object of the invention to provide a new and improved signal counting or frequency meter device of the servo-type having means increasing its frequency response and the accuracy with which changes in frequency of the signal being measured are followed.

Another object of the invention is to provide a new and improved frequency meter device which is simple and inexpensive in operation and construction.

Another object of the invention is to provide a new and improved frequency meter device which continuously delivers an output signal reflecting the frequency of input signals.

Another object of the invention is to provide a new and improved frequency meter device which does not require special conversion apparatus for delivering its information signals in binary form.

Another object of the invention is to provide a new and improved frequency meter device which can follow and measure the frequency of the input signal with increased accuracy while its frequency is changing.

Another object of the invention is to provide a new and improved frequency meter device which may be adapted to arrive at and deliver an output information signal having the accuracy required with a minimum of delay.

Another object of the invention is to provide a new and improved frequency meter device which may readily measure high and low frequency signals.

Another object of the invention is to provide a new and improved frequency meter device which may be readily adapted for various design and system requirements.

The above objects as well as many other objects of the invention will be apparent from the description of the invention when read in conjunction with the drawings, in which:

Figure 1 is a block diagram illustrating an embodiment of the invention, and

Figures 2, 3, and 4 each illustrate in block form and in greater detail a modified embodiment of the invention shown in Figure 1.

Like reference numerals designate like parts throughout the several views.

Refer to Figure 1 which illustrates a frequency meter or counting device 10 having an input terminal 12 for receiving signals having a pulse repetition rate or frequency $f$ which is to be measured. The signals received by the terminal 12 are delivered to the forward count input lead 14 of a reversible counter 16 of the binary type. The counter 16 is arranged in cascade with second and third reversible counters 18 and 20. Neither counter 20 nor any additional cascade counters which may be added after the counter 20 is required for the operation of the invention. The counter 20, however, is included for purposes of illustrating the versatility of the counting device 10.

Forward carry signals are delivered by the counter 16 over the output line 15 to the forward count input lead 22 of the counter 18 through the buffer 23, while backward carry signals from the counter 16 are delivered over its output line 17 to the backward count input lead 24 of the counter 18 through the buffer 25.

Similarly, the counter 18 delivers forward carry signals over its output line 19 to the forward count input lead 26 of the counter 20 through a buffer 27, and delivers backward carry signals over its output line 21 and through a buffer 27 to the backward count input lead 28 of the counter 20.

The sets of output leads 30, 32, 34 of the counters 16, 18, and 20 deliver, in binary form, the respective counts $C_1$, $C_2$, and $C_3$. The count signals delivered by the output lines 30, 32 and 34 actuate the rate control lines of the corresponding units 36, 38 and 40 of a binary rate multiplier 42.

The binary rate multiplier 42 may be of the type described by Bernard M. Gordon in an article entitled "Adapting Digital Techniques for Automatic Controls," published in the November 1954 issue of Electrical Manufacturing magazine.

The unit 40 of the rate multiplier 42 is activated by signals received on the input terminal 44 having a predetermined frequency $f_0$. The unit 36 delivers sequential output signals or pulses having a rate ($Cf_0$) equal to the product of the total count C of the counters 16, 18, and 20 multiplied by the frequency $f_0$ of the signal received at the input terminal 44. These multiplier signals are sequentially delivered to the output line 46 of the binary rate multiplier 42 and are received by the backward count input lead 48 of the counter 16.

The forward and backward carry signals occurring on the respective output lines 15 and 17 of the counter 16 are also respectively delivered to the input leads 50 and 52 of a control network 54. The control network 54 has output lines 56 and 58 for selectively delivering signals to the forward and backward count input leads 22 and 24 of the counter 18. The control network may also be provided with a pair of output lines 60 and 62 for selectively delivering output signals to the forward and backward input count leads 26 and 28 of the counter 20.

In operation, the frequency meter or counting device 10 is in an equilibrium or steady state condition when the rate of signals delivering to the input terminal 12 is equal to the rate of signals delivered to the output line 46 of the binary rate multiplier 42. Under these circumstances, the number of forward count signals delivered to the input lead 14 of the counter 16 is equal to the number of backward count signals delivered to the backward count lead 48 over a given period of time. Thus, the count $C_1$ of the counter 16 is substantially constant and no carry signals are delivered to the following counter 18. Likewise, the count $C_2$ of the counter 18 remains constant and the counter 18 does not deliver carry signals to the counter 20 so that its count $C_3$ also remains constant.

From the cascade arrangement, the counter 16 has a count $C_1$ which is of lowest numerical significance, while the counter 18 has a count $C_2$ of greater numerical significance, and the counter 20 has the count $C_3$ of highest numerical significance. The combined counts $C_1$, $C_2$, and $C_3$ of the counters 16, 18, and 20 are equal to the total count C of the circuit 10.

Since under steady state conditions, the rate of signals on the input terminal 12 is equal to the rate of signals on the output line 46, the following relationship is established:

$$f = Cf_0$$
$$C = f/f_0$$

Under such steady state conditions, the counter 16 does not deliver carry signals to the input lines 50 and 52 of the control network 54, and the control network 54 does not deliver output signals over its lines 56, 58, 60, and 62.

However, under unbalanced or transient conditions where, for example, the rate of signals on the input terminal 12 exceeds the rate of product signals on line 46 by a predetermined amount, the control network 54 receives forward carry signals on line 50 and delivers output signals on its line 56 to the forward count lead 22 of the counter 18. The rate of occurrence of carry signals is directly related to the degree of unbalance.

By this action, the rate of increase of the count C of the device 10 is accelerated, thereby increasing the speed with which the circuit 10 approaches its steady state condition.

During conditions of sufficient high unbalance of the device 10, signals may also be delivered over the output line 60 of the control network 54 to the forward input lead 26 of the most numerically significant counter 20. This will increase the count of the apparatus 10 at a greater rate, thereby more speedily reducing the difference between the transient count and the count C which will be assumed by the apparatus 10 in its steady state condition.

Where the device 10 is in a sufficiently unbalance condition due to the rate of the signals at the input terminal 12 being less than the rate of signals delivered by the output line 46, the following action takes place. The control network 54 receives backward carry signals on the line 17 and delivers output signals over its line 58 to the backward count input lead 24 of the counter 18, thereby accelerating the reduction of the count C of the apparatus 10. If the unbalance is greater than a given amount, the control network 54 will deliver signals over its output line 62 to the backward count input lead 28 of the most significant counter 20, thereby reducing at a greater rate the count C of the circuit 10.

As the unbalance decreases, the control network 54 may be provided for terminating the delivery of signals over the output line 62 soon after the steady state count C is reached and passed or before such time to prevent the over-shooting of the steady state count of the device 10. Signals may, however, continue to be delivered over the output line 58 to the counter 18 of intermediate numerical significance to further reduce the unbalance condition. The control network 54 will discontinue delivering signals to the counter 18 soon after the steady state count C is reached and passed or before such time as the steady state condition is approached to prevent over-shooting the desired steady state count.

It is noted that the stabilizing action of the device 10 without the control network 54 would cause the count C to approach its steady state value at an exponential rate, which rate decreases as the final balance condition is approached. This action is accelerated by the delivery of additional count signals by the control network 54. The control network 54 effectively by-passes the counters of lower numerical significance when the unbalance is sufficiently great, thereby accelerating the action of the apparatus in reaching its steady state condition.

It is also noted that when the device 10 is provided with counting stages for high static accuracy, the dynamic response of the device 10 closely aproaches the higher speed of response afforded by a counter having a smaller number of counters of higher numerical significance. This results from selectively delivering input signals to the stage which corresponds with the amount of unbalance of the device 10.

Thus, when the circuit 10 is in its steady condition or sufficiently close to it, the control network 54 will not deliver output signals. However, when the apparatus is in the unbalance condition and the unbalance state is sufficiently great to require correction of the count $C_2$ of the counter 18, the counter 16 will be by-passed by the delivery of signals from the control network 54 directly to the input of the counter 18. Likewise, when the error is sufficiently great to require appreciable correction of the count $C_3$ of the counter 20, the control network 54 will deliver signals directly to the input of the counter 20. When the count of the counter 20 is sufficiently accurate, although not precisely accurate, delivery of signals directly to this counter 20 may be terminated, while signals to the counter 18 directly from the control network 54 will be delivered until the required degree of accuracy of the count $C_2$ of the counter 18 is attained. Further delivery of signals solely to the input of the counter 16 then serves to place the circuit 10 in its steady state condition and gives the maximum degree of accuracy attainable under static conditions.

It is noted that the device 10, when the frequency of the signal on the terminal 12 is varying, allows the count C to more quickly follow the changes occurring, although perhaps not with the accuracy obtained during static conditions, where the frequency of the signal $f$ on the input terminal 12 remains constant. It is noted, however, that the circuit 10 maximizes the accuracy obtainable, since if the device 10 did not provide means for quickly changing its count under such signal variations, the count C would be even less accurate in its dynamic response. Under conditions of rapid fluctuation in the frequency of the input signal at terminal 12 causing sufficient unbalance so that the control network 54 by-passes the least significant counter 16, the accuracy of the count C of the device 10 is nevertheless maximized since the count $C_1$ of the least significant counter 16 at this time has no significance. Of course, the accuracy in terms of number of significant digits increases with the decrease in the rate of fluctuation of the signal $f$ on the input terminal 12, providing the maximum accuracy under static conditions.

It is noted that a great advantage of the device 10 is its ability to speedily follow large rapidly occurring changes or fluctuations in the frequency $f$ of the input signal being measured, while yet providing the high accuracy of a multi-stage cascade counter for decreased rates of fluctuation in the frequency $f$ of the input signal 12.

Refer now to Figure 2 which discloses in greater detail the device 10 of Figure 1.

The cascade counters 16, 18, and 20 and the binary rate multiplier 42 are arranged identically as shown in Figure 1.

The unit 40 of the binary rate multiplier 42 which receives the actuating pulses of frequency $f_0$ from terminal 44 delivers on its output line 77 pulses having a frequency $f_0$ divided by a factor 2 to the power $n_1$ which corresponds to the number of binary stages in the unit 40. The signals on the line 77 actuate the unit 38 of the binary rate multiplier 42 which in turn delivers to its output line 79 signals having a frequency $f_0$ divided by 2 to the power of the sum of the stages $n_1$ and $n_2$ respectively of the units 40 and 38. The signals on the output line 79 actuate the unit 36 of the binary rate multiplier 42.

The unit 40 of the binary rate multiplier 42 delivers on its output line 81 signals having a product rate $C_3 f_0$. The signals on the output line 81 are buffed with the signals produced by the unit 38 of the binary rate multiplier 42 delivering on the output line 83 of the unit 38 a combined product signal having the rate $(C_2 + C_3)f_0$. The signals on the line 83 are buffed with the product signal from the unit 36 of the binary rate multiplier 42 delivering to the output line 46 of the multiplier 42, the total product signal having a rate equal to the sum of the counts $C_1$, $C_2$ and $C_3$ multiplied by the frequency $f_0$ of the activating signal on the terminal 44. Since the sum of the count signals $C_1$, $C_2$ and $C_3$ is equal to the total count C of the device 10, the rate of the output signal on line 46 may be represented by $Cf_0$.

As previously described, when the input signal on terminal 14 has a rate exceeding that of the signal on the line 46, the count C of the device 10 increases, thereby increasing the product signal $Cf_0$ on line 46. When the rates of signals on the input terminal 12 and the output line 46 of the rate multiplier 42 are equal, the count C of the device 10 corresponds to the frequency or rate of the input signal on terminal 12 and the device 10 is in its steady state condition.

The control network 54 which accelerates the action of the counting circuit 10 in assuming its set steady state condition will now be described in detail.

The control network 54 comprises a first forward control circuit 64 and a first backward control circuit 66 and may include a second forward control circuit 68 and a second backward control circuit 70.

Forward carry signals delivered to the output line 15 of the counter 16 are delivered over line 50 to a delay flop 72 and a control gate 74. The delay flop 72 is the type which upon receiving an actuating signal from input line 50 delivers an output signal for a predetermined period of time. The control gate 74 is conditioned to pass signals on the line 50 during the occurrence of an output signal from the delay flop 72.

A signal passed by the control gate 74 is delivered to a flip-flop 76 placing it in its set condition. The flip-flop 76 also receives backward carry signals on line 52 from counter 16, placing it in its reset condition.

When the flip-flop 76 is in its set condition, it delivers a gating signal to the forward output gate 78 conditioning it to pass signals. The forward output gate 78, when conditioned to pass signals, delivers signals from an input line 80 over the output line 56 and through the buffer 23 to the forward count input lead 22 to the counter 18.

A selector switch 82 set in the position shown in Figure 2 permits the delivery of signals to the input line 80 from the input terminal 12 over line 84. When the selector switch 82 is set to its other position contacting the terminals 86, signals received by the input terminal 88 are delivered to the input line 80. The signals received by the input terminal 88 have a predetermined frequency $f_1$.

The backward control circuit 66 is provided with a delay flop 92 which is actuated by the occurrence on line 52 of backward carry signals from the counter 16. The delay flop 92 when actuated delivers a gating signal for a predetermined period of time to the backward control gate 94. The backward control gate 94 during the period of time when it receives a gating signal from the delay flop 92 passes signals received on the line 52 to a flip-flop 96 placing it in its set state. The flip-flop 92 is reset by the occurrence of a forward carry signal on the line 50.

When the flip-flop 96 is in its set condition, it delivers a gating signal to the backward output gate 98 conditioning it to pass signals. The output gate 98, when thus conditioned by the flip-flop 96, passes signals occurring on an input line 100 over the output line 58 and through the buffer 25 to the backward count input lead 24 of the counter 18.

When the selector switch 82 is in the position shown in Figure 2, the input line 100 receives signals over a line 85 from the output line 46 of the rate multiplier 42. When the selector switch 82 is placed in its other position contacting the terminals 86, signals from the terminal 88 having the frequency $f_1$ are delivered to the input line 100.

The second forward and backward control circuits 68 and 70 may be respectively identical to the forward and backward control circuits 64 and 66. The second forward control circuit 68 samples forward carry signals on the output line 50 of the counter 16 and conditionally delivers signals on the input line 80 to the forward count input lead 26 of the counter 20 over the output line 62 and through the buffer 27.

The second backward control circuit 70 samples backward carry signals occurring on the output line 52 from the counter 16 and conditionally delivers signals on the input line 100 to the backward count input lead 28 of the counter 20 over the line 62 and through the buffer 29.

The second forward and backward control circuits 68 and 70 although respectively shown to sample signals on the forward and backward carry lines 50 and 52 of the counter 16, may be respectively energized by forward and backward carry signals occurring on the output lines 19 and 21 of the counter 18.

In the operation of the forward control circuit 64 of the control network 54, the occurrence of a forward carry signal on the line 50 from the counter 16 is not passed by the forward control gate 74 unless the delay flop 72 had been previously activated and is delivering an output gating signal to the gate 74. Since the output gating signal of the delay flop 72 is present for a predetermined length of time after it is actuated by a signal on the line 50, a subsequent signal on the line 50 will be passed by the control gate 74 only if it occurs within this predetermined period. Thus, if the rate of carry signals occurring on the forward output line 50 of the counter 16 is sufficiently high, a signal will be passed by the forward control gate 74 placing the flip-flop 76 in its set state.

With the flip-flop 76 in its set state, the output gate 78 is conditioned for delivering forward count signals to the forward count input lead 22 of the counter 18. This results in the count of the counter 18 increasing at an accelerated rate tending to place the device 10 in its balanced or steady state condition. As the count of the counter 18 increases, the rate of signals delivered to the line 46 of the binary rate multiplier 42 correspondingly increases. When the rate of signals on the output line 46 is sufficiently great to cause the counter 16 to count backward and deliver a backward carry signal on its output line 17, the flip-flop 76 is reset preventing the further delivery of forward count signals to the counter 18. The backward control circuit 66 operates in a correspondingly similar manner having its operation initiated by the rate of backward carry signals corresponding to a minimum unbalanced condition in the other direction, and terminated by a forward carry signal.

In the operation of the device 10, if the rate of signals delivered to the input terminal 12 is equal to the rate of signals on line 46 from the rate multiplier 42, the counter 16 maintains its count substantially constant and does not deliver carry signals over the output lines 50 and 52. In this case, the device 10 is in its equilibrium condition, and its count C is proportional to the frequency $f$ of the signal delivered to the input terminal 12.

If the frequency $f$ of the signal on the input terminal 12 exceeds the rate of signals on the line 46 of the rate multiplier 42, the counter 16 is caused to count in the forward direction increasing its count $C_1$. This also results in the delivery of forward carry signals on the output line 15 of the carrier 16 which is passed through the buffer 23 to the forward count input lead 22 of the counter 18. This causes the increase in the count $C_2$ of the counter 18 which passes its carry signals over its forward output carry line 19 through the buffer 27 to the forward count input line 26 of the counter 20. In this manner, the count C of the device 10 increases until an equilibrium condition is established between the rates of the signals delivered to the forward and backward input leads 14 and 48 of the counter 16.

If the above unbalanced condition of the input signal on terminal 12 and the signals on the line 46 is great, the counter 16 will count forward at a rapid rate and correspondingly deliver forward carry signals to the line 50 at a correspondingly rapid rate. If the rate of signals corresponds to a predetermined minimum degree of unbalance, the forward control circuit 64 will deliver signals to the counter 18 increasing the rate at which the count C of the apparatus 10 is changing.

The backward control circuit 66 operates in a similar manner to accelerate the decrease of the count of the device 10 by delivering signals to the backward count lead of the counter 18 when the unbalance in the reverse direction exceeds a minimum value. In this case, the apparatus 10 is caused to count in the backward direction until a forward carry count is delivered by the counter 16 which resets the flip-flop 96 and prevents the further delivery of backward count signals to the counter 18.

Upon the delivery of a forward or backward carry signal from the counter 16 terminating respectively the action of the control circuits 64, 66, the device 10 has approached sufficiently close to its equilibrium state, barring further variation in the frequency of the input signal, so that the rate of carry signals from the counter 16 is sufficiently reduced to prevent the reactivation of the control network 54. The continuing servo-action of the device 10 completes the balancing action for placing the device in its steady state condition.

It is noted that the forward and backward control circuits 64 and 66 cannot be activated at the same time, since a carry signal acting to activate one of the circuits terminates the action of the other circuit.

It is also noted that single isolated carry signals from the counter 16 have no affect in activating the control network 54. The rate of carry signals which are directly related to the degree of unbalance, however, does affect the control network 54 and conditions it for accelerating the rate of increase or decrease in the count of the device 10 for establishing the steady state condition, and for rapidly following changes in the frequency of the input signal at the terminal 12.

The output count signals delivered by the control network 54 may be the forward and backward count input signals of the counter 16, or the signals of predetermined frequency $f_1$, from the terminal 88 depending upon the position of the selector switch 82. When the selector switch 82 is in the position shown in Figure 2, the control network 54 in effect operates to by-pass the least numerically significant counter 16 and delivers carry signals to the forward or backward count input leads of the counter 18 when the unbalanced condition of the device 10 exceeds a predetermined minimum amount.

The second forward and backward control circuits 68 and 70 may be employed when the unbalance condition is greater than the minimum unbalance condition necessary to actuate the control circuits 64 and 66 for selectively delivering forward and backward input signals to the counter 20 which has a count of greatest numerical significance. For the purpose of their activation, the forward and backward control circuits 68 and 70 may be adapted for respectively sampling carry signals from the counter 16 or from the counter 18.

It is also noted that when the selector switch 82 is in the position shown in Figure 2, the signals delivered by the control network 54 vary depending upon the frequency of the input signal on terminal 12 and the rate of signals on the output line 46 of the rate multiplier 42, whereas when the switch 82 is placed in its other position, signals having a constant frequency $f_1$ will be delivered irrespective of the frequency $f$ of the input signal to terminal 12 and the condition of the device 10. The position of the selector switch 82 may be determined and set for the particular operating conditions involved to obtain optimum operation of the device 10.

Refer now to Figure 3 which discloses a frequency meter device 102 having a control circuit 104 of modified form. The counters 16 and 18 of the frequency meter device 102 and the rate multiplier 42 with units 36 and 38 are similar to those of the device 10. The device 102 illustrates the use of two cascade counters 16 and 18, although more such cascade counters can be added.

The control circuit 104 is connected to function as a forward control circuit, receiving forward carry signals on line 50 from the counter 16. The forward carry signals on line 50 are delivered to a delay flop 106 and a forward control gate 108. When energized by a signal on the line 50, the delay flop 106 delivers a gating signal for a predetermined period of time to the forward control gate 108. When gate 108 receives a gating signal, it is conditioned to pass signals on the line 50 to a second delay flop 110. The delay flop 110 delivers a gating signal for a predetermined period of time to a forward output gate 112 conditioning it to deliver signals from the input line 100.

Signals passed by the gate 112 are delivered over the output line 56 through the buffer 23 to the forward count input lead of the counter 18. These signals, however, are delivered only for the predetermined period during which the delay flop 110 delivers a gating signal to the output gate 112.

A backward control circuit identical to the forward control circuit 104 may be provided. Such a circuit would be energized by signals from the backward carry output line 17 of the counter 16, and may deliver its output signals to the input lead 58 of the buffer 25 for delivery to the backward count input of the counter 18.

In operation the device 102 in its steady state condition provides a count C which is directly related to the frequency $f$ of the input signal 12. If the frequency $f$ of the input signal 12 increases so that the device 102 is in an unbalanced condition, the count of the counter 16 increases and delivers forward carry signals over its output line 15. If the unbalanced state of the device 102 is insufficient so that the rate of carry signals on the output line 15 is below a minimum value, the control circuit 104 will not be activated.

When the rate of carry signals delivered by the counter 16 to the forward carry line 15 is greater than the minimum value required, the control network 104 will be activated as follows. A carry pulse will be delivered to the control gate 108 and will not be passed by the gate 108 if it does not receive a gating signal from the delay flop 106. This signal, however, will activate the delay flop 106 causing it to deliver a gating signal to the gate 108 for a predetermined period. When the subsequent signal occurs on line 50 (under the assumed conditions of unbalance), it will arrive during the period of the gating signal from the delay flop 106 and will be passed through the gate 108. Signals passed by the forward control gate 108 are delivered to the second delay flop 110 which is actuated to deliver a gating signal to the output gate 112 for a predetermined period of time. The output gate 112 during the period that it receives the gating signal from delay flop 110 delivers signals on the line 100 to the counter 16 over the line 56 and through the buffer 23. The delivery of forward count signals to the counter 18 increases the count of the device 102 and tends to accelerate its action placing it in its steady state condition.

The minimum degree of unbalance of the device 106 required for actuating the control circuit 104 may be adjusted by varying the period during which the delay flop 106 delivers an output signal when it is activated. Thus, if the period of the output signal of the delay flop 106 is increased, the rate of signals required on line 50 to actuate the device 104 is reduced. However, when the period of the output signal of the delay flop 106 is reduced, the rate of carry signals on line 50 must be higher in order for a signal to pass through the control gate 108 to condition the delivery of signals over the line 56 to the counter 18.

The period during which signals will be delivered to the counter 18 once the device 104 is actuated, can also be adjusted by varying the period during which an output signal is delivered by the delay flop 110 upon actuation. The period or time duration of the output signal of the delay flop 110 is related to the minimum unbalance of the device 102 required for actuating the control circuit 104. Of course, the control circuit 104 will be continually actuated by signals on the line 15 until the rate of carry signals is reduced below the minimum value required. At this time, the unbalance of the counting device 102 has been sufficiently reduced by this accelerating action so that the delivery of output signals by the control network 104 is no longer required or desired.

The backward control network similar to network 104 is actuated by backward carry signals on line 17 from the counter 16 which occur when the device 102 is unbalanced in the opposite direction and operates in a similar manner to provide like results.

Refer now to Figure 4 which discloses a control circuit 114 which is identical to the control circuit 104 except that an output gate 116 is provided instead of the output gate 112 of the circuit 104. The output gate 116 is conditioned for passing signals from the line 100 to the line 56 only when it concurrently receives gating signals from the delay flops 106 and 110.

This arrangement allows the control circuit 114 to deliver signals to the output line 56 over a period of time which varies with the rate of the actuating signals delivered to the line 50. This also permits the minimum rate of signals on line 50 which is required for actuating the circuit 114 to be lowered, without causing the device 102 to pass through and hunt about its balanced or steady state condition.

As explained in connection with the circuit 114, when the rate of signals on line 50 is greater than a predetermined value, the gate 108 will deliver a signal to the delay flop 110. The occurrence of gating signals from the delay flop 106 and 110 conditions the output gate 116 to deliver signals on its output line 56 for accelerating the action of the device 102 in assuming its steady state condition.

As the rate of signals on line 50 increases, the interval between the occurrence of the signal activating the delay flop 106 and the succeeding signal passing through the gate 108 to activate the delay flop 110 is reduced. This permits the concurrent gating signals delivered by the delay flops 106 and 110 to the gate 116 to be applied over an increased period of time. This extends the time during which signals are delivered by the output line 56 to the counter 18 of the device 102 accelerating its action. Of course, the greater the rate of signals on line 50, the greater is the unbalanced condition and the larger is the number of signals on line 56 which is required for balancing the device 102.

It will be noted that the maximum individual period during which the gate 116 will receive concurrent signals from the delay flops 106 and 110 approaches the period of the output signal of the delay flop 106 or the delay flop 110, whichever is the shorter.

Of course, if the device 112 is not in its balanced state after the occurrence of one such operation, the rate of signals on the line 50 will exceed the minimum value and will cause the circuit 114 to be actuated for repeating this action. This continues until the rate of signals on the line 50 is below the minimum required for actuation of the circuit 114, after which the circuit 102 completes the balancing operation by usual servo-action of the device 102.

The circuit 114 may be used for a forward control operation, and another circuit 114 may be utilized for the backward control operation, as illustrated in connection with Figure 2. Additional sets of forward and backward control circuits 114 may be utilized in the manner also illustrated in Figure 2.

It will, of course, be understood that the description and drawings, herein contained, are illustrative merely, and that various modifications and changes may be made in the structures disclosed without departing from the spirit of the invention.

What is claimed is:

1. A counting apparatus having first and second cascade connected counting devices storing a count, an input terminal for receiving information signals, means for applying information signals from said input terminal to the input of said first counting device, a feedback loop coupled to said counting devices and responsive to said count for delivering feedback signals to said first counting device tending to place said apparatus in a steady state condition; and a control network for determining an unbalanced condition of said apparatus in response to carry output signals from said first counting device to provide additional signals to at least one of said counting devices for changing said count, thereby accelerating the action of said apparatus tending to place it in its steady state condition.

2. The counting apparatus of claim 1 in which said control network delivers signals to said second counting device to change its count for accelerating the action of said apparatus tending to place it in its steady state condition.

3. A counting apparatus having an input terminal for receiving information signals, a first reversible counting device having a forward input lead receiving signals from said input terminal and a backward input lead receiving feedback signals tending to place the counting apparatus in a steady state condition, and a second reversible counting device having an input receiving forward and backward carry signals from said first counting device; means coupled to said reversible counting devices for providing said feedback signals, and a control network for determining an unbalanced condition of said apparatus in response to carry signals from said first counting device to provide additional signals to at least one of said counting devices for changing the count thereof, thereby accelerating the action of said apparatus tending to place it in its steady state condition.

4. The counting apparatus of claim 3 in which said control network delivers signals to the input of said second counting device to change its count for accelerating the action of said apparatus tending to place it in its steady state condition.

5. A counting apparatus comprising an information input terminal; a first reversible counting device having a forward input lead receiving signals from said input terminal, a backward input lead, a carry output, and a count output; a second reversible counting device having an input receiving forward and backward carry signals from said first counting device, and a count output; rate multiplier means coupled to and controlled by the signals from the outputs of said first and second counting devices and having an input line for receiving activating signals, and an output line delivering signals to the backward input lead of said first counting device; and a control network for determining an unbalanced condition of said apparatus in response to carry signals from said first counting device to provide additional signals to at least one of said counting devices for changing the count thereof, thereby accelerating the action of said apparatus tending to place it in its steady state condition.

6. The counting apparatus of claim 5 in which said control network is energized by forward and backward carry signals from said first counting device to respectively increase and decrease the count of said apparatus for accelerating its action tending to place it in its steady state condition.

7. The counting apparatus of claim 6 in which said control network selectively increases and decreases the count of said apparatus by delivering signals to the input of said second counting device.

8. A frequency meter apparatus comprising an information input terminal for receiving pulse signals at a frequency ($f$); a first forward-backward binary counting device having a forward count input lead excited by signals from said input terminal, a backward count input lead, a carry output, and a plurality of count output leads; a second forward-backward binary counting device coupled to and having an input excited by signals from the carry output of said first counting device, and a plurality of count output leads; binary rate multiplier means coupled to and energized by the count signal (C) from the count output leads of said first and second counting devices and having an input line for receiving pulse signals having a frequency ($f_0$) and an output line delivering the product signals ($Cf_0$) to the backward count input lead of said first counting device so that at steady state condition of said apparatus its count (C) corresponds to the ratio ($f/f_0$) of the respective frequencies ($f$ and $f_0$) of the signals received by said input terminal and input line of said multiplier unit; and a control network for determining an unbalanced condition of said apparatus in response to carry signals from said first counting device to provide additional signals to said second counting device for changing the count thereof, thereby accelerating the action of said apparatus tending to place it in its steady state condition; said control network when energized by forward carry signals from said first counting device delivering signals to said second counting device for increasing its count, and when energized by backward carry signals from said first counting device delivering signals to said second counting device for decreasing its count.

9. A counting apparatus comprising a plurality of cascade connected reversible counting devices storing a count, an input terminal for receiving information signals, means coupling signals received on said input terminal to the input of the first of said counting devices, a feedback loop coupled to said counting devices and responsive to said count for delivering feedback signals to said first counting device which are related to said count to place said apparatus in a steady state condition; and a control network coupled to said device and delivering additional signals to selected ones of said counting devices for changing said count and accelerating the action of said apparatus tending to place it in its steady state condition.

10. The counting apparatus of claim 9 in which said control network is energized by carry signals from at least one of said counting devices.

11. The counting apparatus of claim 10 in which said control network detects the frequency of said carry signals for determining the amount of unbalance of said counting apparatus.

12. The counting apparatus of claim 11 in which one of said plurality of counting devices to which said control network delivers signals for changing its count is determined by the amount of unbalance of said apparatus; said network for increasing unbalanced conditions of said apparatus delivering signals to a selected one of said counting devices of increasing numerical significance with respect to the first of said counting devices.

13. The counting apparatus of claim 12 in which said control network delivers signals increasing the count of said apparatus when it detects forward carry signals, and delivers signals decreasing the count of said apparatus when it detects backward carry signals.

14. The counting apparatus of claim 13 in which said control network delivers signals from said input terminal for increasing the count of said apparatus, and delivers signals from said feedback loop for decreasing the count of said apparatus.

15. A frequency meter apparatus comprising a plurality of cascade connected reversible counting devices of increasing numerical significance each having a carry output coupled to and delivering forward and backward count signals to the next succeeding counting device, and a plurality of count output leads delivering a count signal (C); the first counting device of least numerical significance of said counting devices having a forward count input lead for receiving information signals of frequency ($f$), and a backward count input lead; rate multiplier means energized by the count signal (C) coupled by the count output leads of said counting devices for controlling its rate and having an input line for receiving pulse signals having a frequency ($f_0$) and an output line delivering the product signals ($Cf_0$) to the backward count input lead of said first counting device so that at steady state condition of said apparatus its count (C) corresponds to the ratio ($f/f_0$) of the respective frequencies ($f$ and $f_0$) of the signals received by the forward count input lead of said first counting device and the input line of said rate multiplier means; and a control network for determining an unbalanced condition of said apparatus in response to the frequency of occurrence of carry signals coupled from said counting devices; said control network delivering signals to said counting devices to change the count thereof by increasing and decreasing said count in response to forward and backward carry signals, respectively, said control network selectively delivering signals to the input of the one of said counting devices having a numerical significance corresponding to the amount of unbalance of said apparatus.

16. A counting apparatus comprising a plurality of cascade connected reversible counting devices storing a count, an input terminal for receiving information signals, means coupling signals received on said input terminal to the input of the first of said counting devices, and a feedback loop coupled to said counting devices and responsive to said count for delivering feedback signals to said first counting device which are related to said count and tend to place said apparatus in a steady state condition; a forward control network having a delay device placed in its set condition by a forward carry signal coupled from one of said counting devices and returning to its reset condition after a predetermined delay time, a first gate conditioned by said delay device in its set condition to pass forward carry signals, a flip-flop circuit set by a signal from said first gate and reset by a backward carry signal coupled from one of said counting devices, and a second gate conditioned by said flip-flop circuit in its set condition to deliver output signals to said counting devices for increasing the count thereof; the second gate of said forward control network being inhibited upon the occurrence of said backward carry signal which resets said flip-flop circuit.

17. The counting apparatus of claim 16 provided with a backward control network having a delay device placed in its set condition by a backward carry signal from one of said counting devices and returning to its reset condition after a predetermined delay time, a first gate conditioned by said delay device in its set condition to pass backward carry signals, a flip-flop circuit set by a signal from said first gate and reset by a forward carry signal from one of said counting devices, and a second gate conditioned by said flip-flop circuit in its set condition to deliver output signals for decreasing the count of said counting devices; the second gate of said backward control network being inhibited upon the occurrence of said forward carry signal which resets said flip-flop circuit.

18. A counting apparatus comprising a plurality of cascade connected reversible counting devices storing a count, an input terminal for receiving information signals, means coupling signals received on said input terminal to the input of the first of said counting devices, and a feedback loop coupled to said counting devices and responsive to said count delivering feedback signals to said first counting device which are related to said count and tend to place said apparatus in a steady state condition; and a control network having a first delay device placed in its set condition by a carry signal coupled from one of said counting devices and returning to its reset condition after a predetermined delay time, a first gate conditioned by said first delay device in its set condition to pass carry signals, a second delay device placed in its set condition by a signal coupled from said first gate and returning to its reset condition after a predetermined delay time, and a second gate conditioned by said second delay device in its set condition to deliver output signals to said counting devices for increasing said count when said carry signals are forward carry signals and decreasing said count when said carry signals are backward carry signals for accelerating the action of said apparatus tending to place it in its steady state condition.

19. A counting apparatus comprising a plurality of cascade connected reversible counting devices storing a count, an input terminal for receiving information signals, means coupling signals received on said input terminal to the input of the first of said counting devices, and a feedback loop coupled to said counting devices and responsive to said count for delivering feedback signals to said first counting device which are related to said count and tend to place said apparatus in a steady state condition; and a control network having a first delay device placed in its set condition by a carry signal coupled from one of said counting devices and returning to its reset condition after a predetermined delay time, a first gate conditioned by said first delay device in its set condition to pass carry signals, a second delay device placed in its set condition by a signal coupled from said first gate and returning to its reset condition after a predetermined delay time, and a second gate conditioned by said first and second delay devices when concurrently in their set conditions for delivering output signals to said counting devices for increasing said count when said carry signals are forward carry signals and decreasing the count for said counting devices when said carry signals are backward carry signals for accelerating the action of said apparatus tending to place it in its steady state condition.

20. Apparatus for providing an output indication of the ratio between first and second input signal rates comprising, a plurality of cascaded reversible counters, a corresponding plurality of cascaded rate multipliers each coupled to a respective one of said counters and responsive to the count therein for altering the rate of an input signal to the respective rate multiplier, means for coupling said second input signal to the last of said cascaded rate multipliers to derive a feedback signal from the output of the first thereof, means for coupling said first input signal and said feedback signal to the first of said counters to change the count therein in respective opposite directions, and control means coupled to said first counter and responsive to carry pulses therefrom for providing additional signals to at least one following counter for altering the count therein in a direction tending to maintain the count in said counters substantially constant.

References Cited in the file of this patent

UNITED STATES PATENTS

| | | |
|---|---|---|
| 2,537,427 | Seid | Jan. 9, 1951 |
| 2,568,724 | Earp | Sept. 25, 1951 |
| 2,584,866 | Gray | Feb. 5, 1952 |
| 2,717,994 | Dickinson | Sept. 13, 1955 |

OTHER REFERENCES

"An Operational Digital Feedback Divider," article on Transactions of the I.R.E., March 1954, pp. 17–20.